Figure 1:
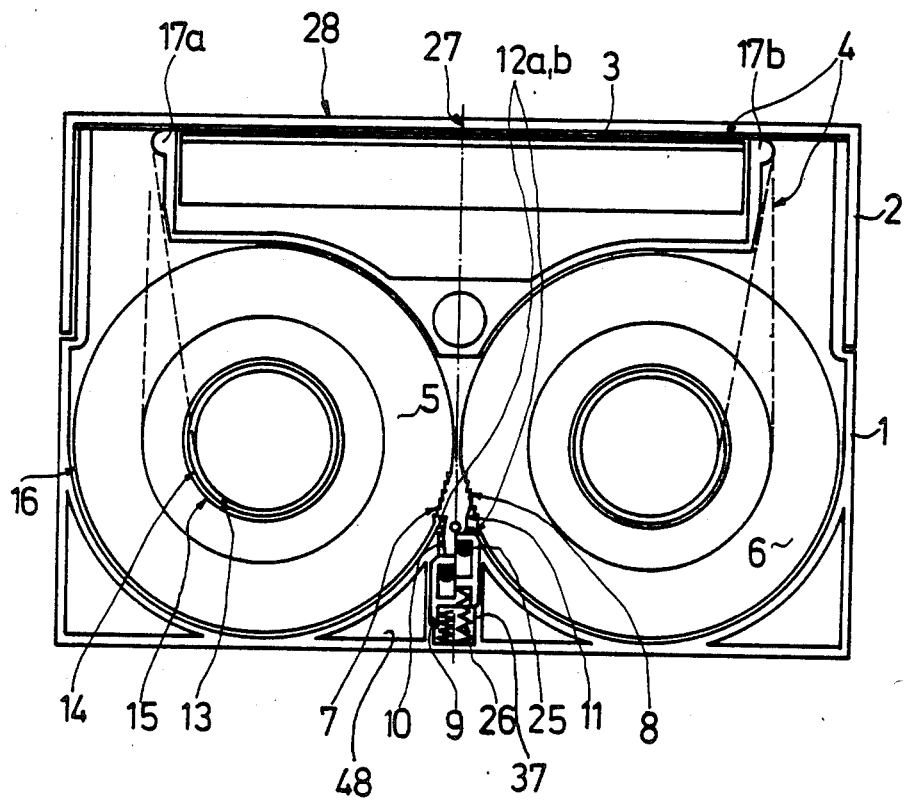

United States Patent [19]

Schoettle et al.

[11] Patent Number: 4,679,110
[45] Date of Patent: Jul. 7, 1987

[54] BRAKE AND TAPE TENSIONING MEANS FOR TAPE CASSETTES HAVING FLANGED REELS, AND A TAPE CASSETTE, IN PARTICULAR A MAGNETIC TAPE CASSETTE, INCLUDING THESE MEANS

[75] Inventors: Klaus Schoettle, Heidelberg; Kurt Schmidts, Kehl; Eugen Kamm, Appenweier; Heinz Berger, Kehl, all of Fed. Rep. of Germany

[73] Assignee: BASF Aktiengesellschaft, Ludwigshafen, Fed. Rep. of Germany

[21] Appl. No.: 751,809

[22] Filed: Jul. 5, 1985

[30] Foreign Application Priority Data

Jun. 7, 1984 [DE] Fed. Rep. of Germany ....... 8420207

[51] Int. Cl.$^4$ ............................................. G11B 23/02
[52] U.S. Cl. ..................................... 360/132; 242/198
[58] Field of Search ................ 360/132; 242/197, 198, 242/199, 204

[56] References Cited

U.S. PATENT DOCUMENTS

| | | | |
|---|---|---|---|
| 3,800,322 | 3/1974 | Schoettle et al. | 242/198 |
| 4,022,401 | 5/1977 | Kishi | 242/198 |
| 4,225,100 | 9/1980 | Sugawara | 242/198 |
| 4,232,840 | 11/1980 | Sugawara | 242/198 |
| 4,288,048 | 9/1981 | Sieben | 242/198 |

FOREIGN PATENT DOCUMENTS 2115782A 9/1983 United Kingdom.

Primary Examiner—Robert S. Tupper
Assistant Examiner—Andrew L. Sniezek
Attorney, Agent, or Firm—Keil & Weinkauf

[57] ABSTRACT

Spring elements, as brake and tape tensioning elements, are provided with two or more locking elements having a predetermined difference in length. The devices of which various embodiments are disclosed can be advantageously used for tape cassettes of any type possessing reel brakes, and in particular for small cassettes.

13 Claims, 6 Drawing Figures

BRAKE AND TAPE TENSIONING MEANS FOR TAPE CASSETTES HAVING FLANGED REELS, AND A TAPE CASSETTE, IN PARTICULAR A MAGNETIC TAPE CASSETTE, INCLUDING THESE MEANS

The present invention relates to brake and tape tensioning means for tape cassettes having a housing and flanged reels contained therein, in which at least one flange carries toothing at its periphery and a spring element engages said toothing in the braking position but not in the release position, and an actuating element provided on the apparatus enters the housing and transfers the spring element from its braking position to its release position and positioning elements provided on the cassette guide each spring element from the braking position to the release position and vice versa, and a tape cassette, in particular a magnetic tape cassette, including such brake and tape tensioning means.

German Laid-Open Application DOS No. 2,918,271, DOS No. 3,217,128 and DOS No. 2,910,783 describe reel brakes for the commercial cassettes of conventional video systems. These reel brakes consist of spring-mounted swivel levers which engage corresponding rectangular toothing on the peripheral edge of the flange and hence secure the reels against unintentional unwinding of the tape during handling or transport of the cassette.

German Laid-Open Application DOS No. 3,007,948 describes a video cassette containing a brake system which essentially consists of a fulcrum bracket which can be actuated from outside the cassette and comprises one pivotably hinged brake lever for each reel, the brake lever interacting with a control surface on the back wall of the cassette in such a way that the levers engage the toothing of the reel flanges after only a short displacement of the fulcrum bracket and, in the course of the residual displacement of the fulcrum bracket, eliminate any tape slack at the front of the cassette by rotation of the reels in opposite directions. This brake system meets both requirements, ie. elimination of tape slack and blocking of the reels to prevent unintentional unwinding of these, for example during transport. Because of its relatively large space requirement and fairly complicated construction (4 components: 1 fulcrum bracket, 2 bearing-mounted brake levers and 1 brake spring), it is unsuitable for cassettes which are to be produced in an economical manner, and in particular for miniature cassettes, eg. the 8 mm video cassette. Hence, the following brake system has been proposed in the specification for the 8 mm video cassette.

Two plate spring-like springs, for the two flange toothings, are mounted on a plastic body which can be moved from outside, so that each individual plate spring is allocated to a reel. In the disengaged position, each of these springs is deflected toward the central transverse axis of the cassette, by projections provided on the housing, so that the ends of the springs are outside the particular flange toothing. If the brake is shifted toward the reels in order to arrest the latter, the springs are released by the stationary housing projections in the first part of the displacement so that they relax and consequently move toward the flange toothing and engage it. Tests have shown that, with this embodiment and a tooth spacing of 1.2 mm, it is possible to take up only about 0.6 mm of any tape slack along the front of the cassette. If the tooth spacing is 0.7 mm, which is the lower limit in practice for injection molding and necessary for proper functioning, effective take-up of tape slack is increased to only 1.2 mm. (The numerical values for tape take-up are given without reference slack since there are at present hardly any apparatuses for the 8 mm video cassette system for determining average tape slack.) This is insufficient to ensure reliable operation of a cassette, since, particularly in the case of the special design of some cassettes with double front flaps, there is a danger that, even in the event of a small amount of tape slack, the tape will become caught between the actual front flap and the dust flap behind this when the front flap is closed, and will become creased. (The numerical values given above relate to the 8 mm video cassette).

It is an object of the present invention to provide effective brakes for flanged reels in tape cassettes, and tape cassettes, particularly magnetic tape cassettes, which include these and are simple to produce, by means of which tape slack can very substantially be eliminated.

We have found that this object is advantageously achieved by brake and tape tensioning means and by a tape cassette according to the claims.

Advantages obtainable by means of the characteristic features of individual claims or any combination of these are:

(a) The means and the tape cassette can be produced and assembled simply and economically,
(b) the means and the cassette operate safely and are reliable,
(c) the tape take-up effect can be varied by using different numbers of locking elements,
(d) the brake forces can be varied by using different numbers of locking elements and spring elements, and
(e) the means and the tape cassette can be reduced in size without altering the operational safety and reliability.

Examples of the invention are shown in the drawing and described below.

Figure 2:
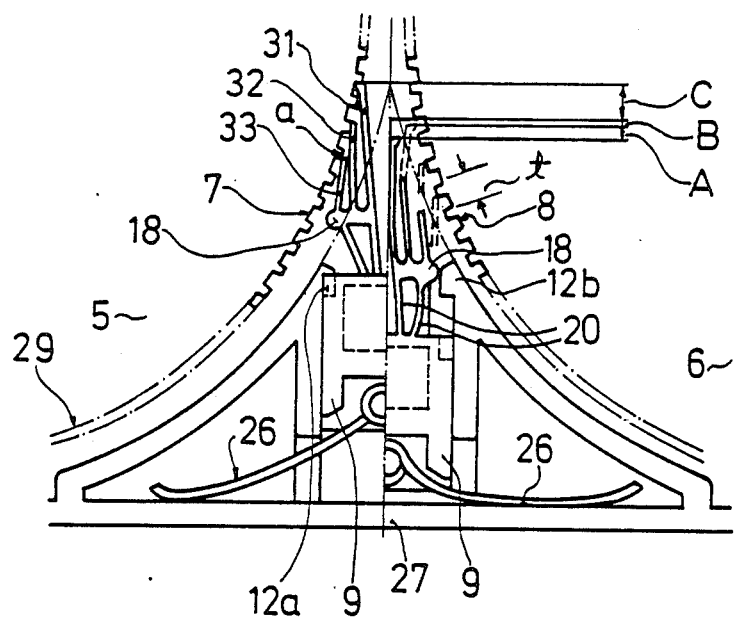
Figure 3:
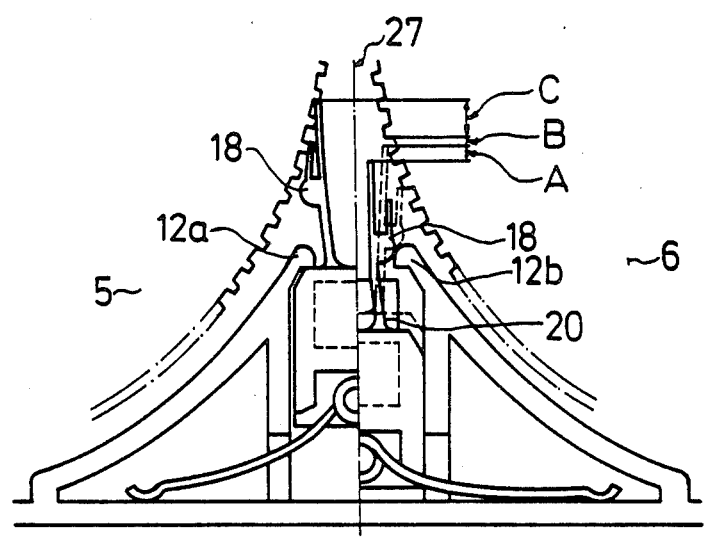
Figure 4:
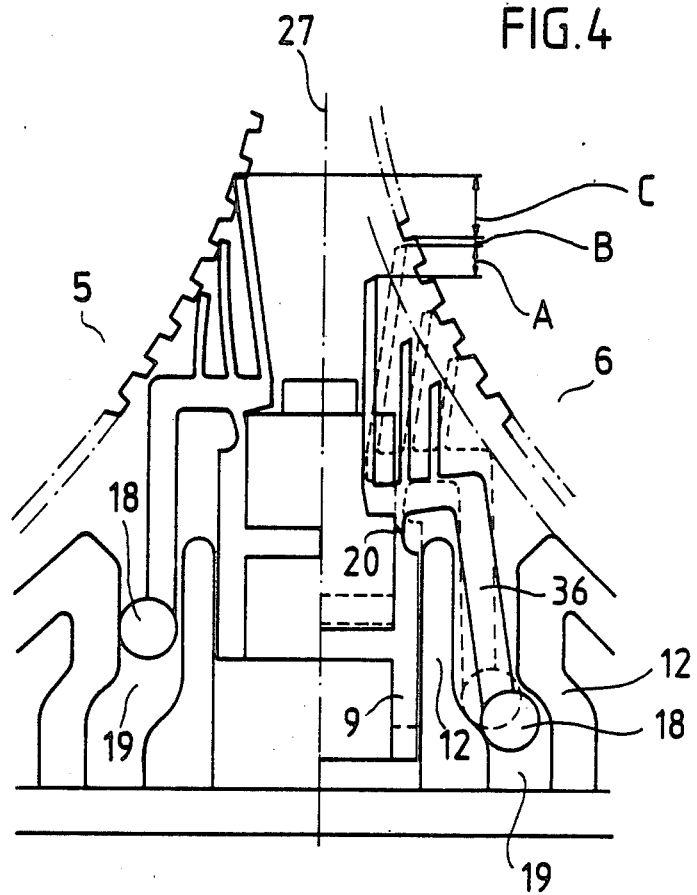
Figure 5:
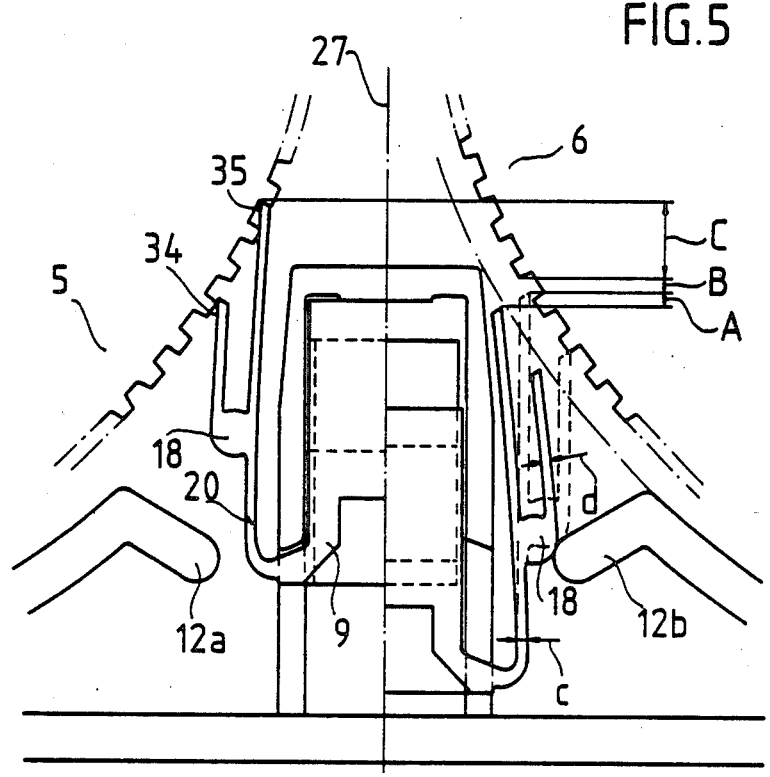
Figure 6:
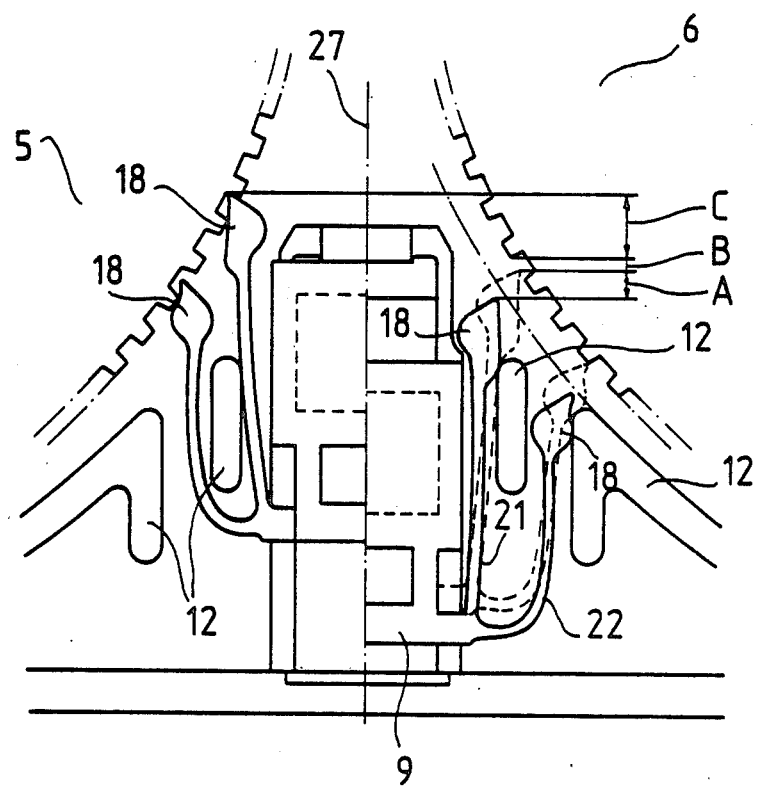

FIG. 1 shows the plan view of an 8 mm video cassette which contains two reels having opposite toothing and a brake element, which is in the disengaged position on the left-hand side and in the engaged position on the right-hand side, FIG. 2 shows a novel reel brake having three pointed locking elements per reel, FIG. 3 corresponds to FIG. 2 but with two locking elements per reel and FIGS. 4, 5 and 6 show other novel reel brakes having three or two brake locking elements per reel.

A known tape cassette, e.g. an 8 mm video cassette, consists of the housing 1, the front flap 2 and the dust flap 3, between which the tape 4, which not threaded in the apparatus, is held by means of the guide elements 17a/b provided on the housing, and the reels 5 and 6 having hubs 13. The movement of the front flap 2 and of the dust flap 3 is described in, for example, published British Patent Application No. 2,115,782 A. During operation, the tape 4 must be held under tension at the front of the cassette within narrow tolerances, since otherwise, when the flaps are closed, the flap ends would catch the tape 4, crease it and/or deflect it from the normal position.

The brake system consists of a brake body 9 which can be displaced by an actuating pin 25 entering from outside, and which is held, under compressive stress, against the reels 5 and 6 by a pressure spring 26 mounted between the housing 1 and the body 9. The body 9 which is usually made of plastic, is provided at the front with two plate spring-like, pointed springs 10 and 11 which are usually V-shaped and each of which is assigned to a reel 5 or 6. For more effective engagement, the springs 10 and 11 are arranged at an angle to the central transverse axis 27 of the cassette so that they point toward the associated reel. One reel flange in each case is provided in a conventional manner with toothing on the outer edge, this being sawtooth toothing 7 in FIG. 1. The type of flanged toothing is of importance for the present invention only in that the engaging flank is advantageously radially oriented.

During the braking process, which takes place automatically when the cassette is removed from the apparatus, the teeth 7 and 8 of the flanged toothing of the reels 5 and 6 are caused to engage the points of the springy locking elements 10 and 11 after a short idle displacement A of the brake body 9 toward the cassette front 28. In an unfavourable case, the locking elements 10 and 11 completely miss meeting the tooth flanks, so that the additional displacement B is first required before the effective engagement of tooth flanks and locking element. In conventional brakes possessing a single locking element per reel, B roughly corresponds to one tooth spacing of the toothing. Only the remaining displacement C can deflect the reels laterally within the tolerance between the bearing edge 14 of the reel 5 and the housing opening 15 and take up any slack of the tape section between the guide elements 17a and 17b at the front flap 3, by rotation of the reels 5 and 6 in opposite directions.

When the reels 5 and 6 are in the release position, the locking elements 10/11 are forced toward the central transverse axis 27 by deflection (cf. locking element 10 in FIG. 1, left-hand side) by stops 12a/b provided on the housing, so that the points of the locking elements (eg. 31 and 32 in FIG. 2) are removed from the area of operation of reels 5 and 6.

FIGS. 2 and 4 show novel brakes according to the present invention having three locking elements 31 or 33 per reel, in various embodiments. FIGS. 3, 5 and 6 show further embodiments of the novel brake having two locking elements 34 and 35 per reel. In all of the brakes according to the invention, the reels shown have trapezoidal or rectangular toothing on the peripheral edge, so that the left-hand and right-hand reels 5 and 6, respectively, can be of completely identical design. Of course, it is also possible for reels having any other toothing, even asymmetrical toothing, to be combined with the novel brake and tensioning means.

In FIGS. 2 to 6, on the right-hand side of the central transverse axis 27 in each case, the brake is indicated by a solid line in the release position and by a dashed line in the brake position after the idle displacement A, in which position the points of the locking elements just come into contact with the flange toothing 29 when the reels 5 and 6 are in a central position. This represents the most unfavourable situation in which none of the locking elements 31-33 directly engages any tooth flank 8 and one locking element 33 (shown as the lowest one) just misses the next tooth flank in the direction of movement (cf. arrow a).

The distance between the uppermost locking element 31 and the next tooth flank thus corresponds to the maximum additional displacement B until the lowest element engages. As shown in the end position on the left-hand side in FIG. 2, the residual displacement C is converted to a lateral shift and/or rotation of the reel 5. In FIGS. 2 to 6, the reel 5 is shown in each case in the extreme upper position deflected through 45° from the center of the cassette.

The difference between the lengths* of the three locking elements 31-33 or the spacing between the points of these locking elements in the (generally load-free) position after the displacement A should be chosen to be different from the tooth spacing t of the toothing 29. Advantageously, for example, if two locking elements are provided as in FIGS. 3, 5 and 6, the diffrence in length between the first locking point, say that of the longest locking element, 31, and the second locking point ("locking point" being defined as the uppermost top of the locking element) is $$x_{1-2} = t(n + \tfrac{1}{2}),$$

if three locking elements are provided as in FIGS. 2 and 4, the difference in length between the first and third locking points is $$x_{1-3} = t(n + \underbrace{\tfrac{1}{2} + \tfrac{1}{4}}_{\tfrac{3}{4}})$$

and if four locking elements are provided (not particularly shown in the drawing) the difference in length between the first and fourth locking points is $$x_{1-4} = t(n + \underbrace{\tfrac{1}{2} + \tfrac{1}{4} + \tfrac{1}{8}}_{\tfrac{7}{8}})$$

where t (shown in FIG. 2) is the tooth spacing and n is 0, 1, 2, 3 or 4. The factor t actually to be used in any given case depends on the radius of the toothed flange, on the displacement stroke of the brake members and on the particular lengths of the locking elements. A suitable selection of this factor is within the skill of the artisan. Obviously, the second term in the brackets continues in a geometric series.

* The difference in length between the locking elements relates to a tangential direction with respect to the periphery of the toothed flange(s).

By way of summary then, the difference in length between the first and the m th locking point is given by the relationship $$x_{1-m} = t(n + s)$$

where
m is an integer greater than one and denotes the number of locking points,
n is 0, 1, 2, 3 or 4, and
s is the geometric series $\tfrac{1}{2} + \tfrac{1}{4} + \tfrac{1}{8} \ldots$, the number of terms in this series being equal to $m - 1$.

The plurality of locking elements 31-35 provided according to the invention, and their differences in lengths, advantageously result in the brake means engaging more rapidly with the toothing, and in better tape tensioning, as shown below.

The table below shows that, in the example of the 8 mm video cassette and for the same tooth spacing t, the effective, minimum tape take-up can be increased by about a factor of 4 by the novel brake means.

These experiments for comparison with the conventional brake system possessing one locking element are based on the following cassette dimensions:

| | | Outer diameter of the reel flange | | | 45.1 mm | |
|---|---|---|---|---|---|---|
| | | Maximum tape roll diameter | | | 43.2 mm | |
| | | Hub diameter 13 | | | 16.0 mm | |
| | | Diameter of reel bearing ring 14 | | | 17.9 mm | |
| | | Housing opening 15 | | | 18.85 mm | |
| | | Total brake displacement | | | 2.75 mm | |
| Brakes Type | Number of | Brake path as % of the total displacement of 2.75 mm | | | Effective reel rotation, | Effective minimum tape take-up |
| Spacing on reel | brake arms | A (min) | B (max) | C (min) | $\bar{x}$ per reel | at the front of the cassette, mm |
| Prior art | | | | | | |
| Standard 1.2 mm (FIG. 1) | 1 | 44% | 38.5% | 17.5% | 1.2° | 0.6 |
| Standard 0.7 mm (FIG. 1) | 1 | 44% | 22% | 34% | 2.3° | 1.2 |
| Invention | | | | | | |
| Type FIG. 4 1.2 mm | 3 | 22.2% | 9.6% | 68.2% | 4.2° | 2.2 |
| Type FIG. 2 1.2 mm | 3 | 32.2% | 7.4% | 60.4% | 4.7° | 2.4 |
| Type FIG. 6 1.2 mm | 2 | 25.8% | 12% | 62% | 4.3° | 2.2 |
| Type FIG. 3 1.2 mm | 2 | 25.6% | 12% | 62.4% | 4.4° | 2.3 |
| Type FIG. 5 1.2 mm | 2 | 14.3% | 13.4% | 72.3% | 5.0° | 2.6 |

As shown in the table, the number of locking elements essentially affects the displacement B. Displacement A is defined by the design, and is the second parameter determining the effectiveness of the tape take-up. Displacement A is dependent on the speed with which the locking points of the locking elements come into contact with the teeth 8 of the flanges when the brake means moves forward.

In order to keep displacement A very short, the particular spring element, which according to the invention consists of locking elements 31-35 and spring bodies 20, is advantageously provided with cam-like extensions or broadened sections 18 which interact with the fixed projections 12a and b of the housing. In the course of the movement of the brake means, the broadened sections come into contact with the said projections 12a and b and slide over these so that the locking elements 31-35 are bent either toward the central transverse axis 27 (release position) or away from this (braking position). If the projections and broadened sections are located on the other side of the particular spring element, they function accordingly.

The extensions or broadened sections 18 are preferably of a form such that an ejector can act at these points to effect removal from the mold during injection molding.

The principle underlying the structure of the spring element is described once again below, with reference to FIG. 5.

The spring body 20 provided starts from the base 9 and possesses a broadened section 18, which is connected to the locking elements 34 and 35, which are likewise springy. The spring characteristics should be adjusted so that the spring constant of the spring body is always greater than that of a locking element 34 or 35, preferably by making the spring body 20 thicker (c ~ 1.5 d, where d is the thickness of the locking element and c is the thickness of the stem of the spring). The spring body 20 may impart greater mobility to the locking elements 34 and 35 together. Various spring bodies 20 are illustrated in FIGS. 2, 4 and 5, first a double spring stem embodiment, then a single short spring stem embodiment and finally a single long version of a spring stem being shown.

In the example shown in FIG. 6, fairly long springy locking elements 21 and 22 without special spring stems 20 are formed directly on the base 9. In particular, a duck-head shape of the broadened sections 18 at the ends of the locking elements 21 and 22 has been chosen here so that additional cams, etc. can be dispensed with. The points of the duck's heads enter the gaps between the teeth to effect braking. In this embodiment, housing projections 12 are also provided between the locking elements 21 and 22.

Another special feature is shown in FIG. 4, where the locking elements 31-33 are connected to a broadened section 18 via an extension arm 36. In this case too, a projection 12 on the housing is provided between the body 9 and the extension arm 36. In another embodiment, it would also be possible for the extension arm 36 with the locking elements 31-33 to be rotatably mounted.

For the sake of clarity, components having the same function have been given the same reference symbols.

The shape and spring force of the locking elements 31-35 and 21 and 22 can be varied as desired, provided that the required effects are retained. The most advantageous method of production is injection molding, and the material used may be any plastic which is suitable for this technique (eg. POM, polyoxymethylene).

We claim:
1. Brake and tape tensioning means for tape cassettes having a housing and flanged reels contained therein, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring the spring element from its braking position to its release position, and positioning elements being provided on the cassette which guide each spring element from the braking position to the release position and vice versa,
> wherein the spring element comprises two locking elements of different lengths, in a tangential direction to the periphery of the toothed flange, said locking elements having two ends, one being an attached end and the other being a free end, locking points being provided at said free ends and the distance between the first and second locking points being determined by the relationship $$x_{1-2} = t(n + \tfrac{1}{2}),$$

where
t is the tooth spacing and
n is the integer 0, 1, 2, 3 etc.,
whereby for the same tooth spacing an increase in the effective minimum tape take-up is achieved.

2. Brake and tape tensioning means for tape cassettes having a housing and flanged reels contained therein, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring the spring element from its braking position to its release position, and positioning elements being provided on the cassette which guide each spring element from the braking position to the release position and vice versa,
> wherein the spring element comprises three locking elements of different lengths, in a tangential direction to the periphery of the toothed flange, said locking elements having two ends, one being an attached end and the other being a free end, locking points being provided at said free ends and the distance between the first and third locking points being determined by the relationship $$x_{1-3} = t(n + \tfrac{1}{2} + \tfrac{1}{4}),$$

where
t is the tooth spacing and n is the integer 0, 1, 2, 3 etc.,
whereby for the same tooth spacing an increase in the effective minimum tape take-up is achieved.

3. Brake and tape tensioning means for tape cassettes having a housing and flanged reels contained therein, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring the spring element from its braking position to its release position, and positioning elements being provided on the cassette which guide each spring element from the braking position to the release position and vice versa,
> wherein the spring element comprises m locking elements of different lengths, in a tangential direction to the periphery of the toothed flange, said locking elements having two ends, one being an attached end and the other being a free end, locking points being provided at said free ends and the distance between the first and m th locking point being determined by the relationship $$x_{1-m} = t(n + s),$$

where
m is an integer greater than one and denotes the number of locking points,
n is 0, 1, 2, 3 or 4, and
s is the geometric series $\tfrac{1}{2} + \tfrac{1}{4} + \tfrac{1}{8} \ldots$, the number of terms in this series being equal to m−1,
whereby for the same tooth spacing an increase in the effective minimum tape take-up is achieved.

4. Brake and tape tensioning means for tape cassettes having a housing and flanged reels contained therein, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring the spring element from its braking position to its release position, and positioning elements being provided on the cassette which guide each spring element from the braking position to the release position and vice versa,
> wherein the spring element comprises two locking elements of different lengths, in a tangential direction to the periphery of the toothed flange, said locking elements having two ends, one being an attached end and the other being a free end, locking points being provided at said free ends, the distance between the first and second locking points being determined by the relationship $$x_{1-2} = t(n + \tfrac{1}{2}),$$

where
t is the tooth spacing and
n is the integer 0, 1, 2, 3 etc.,
and said spring element having a brake element to which is fastened at least one spring body which carries said two locking elements,
whereby for the same tooth spacing an increase in the effective minimum tape take-up is achieved.

5. Brake and tape tensioning means for tape cassettes having a housing and flanged reels contained therein, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring the spring element from its braking position to its release position, and positioning elements being provided on the cassette which guide each spring element from the braking position to the release position and vice versa,
> wherein the spring element comprises three locking elements of different lengths, in a tangential direction to the periphery of the toothed flange, said locking elements having two ends, one being an attached end and the other being a free end, locking points being provided at said free ends, the distance between the first and third locking points being determined by the relationship $$x_{1-3} = t(n + \tfrac{1}{2} + \tfrac{1}{4}),$$

where
t is the tooth spacing and
n is the integer 0, 1, 2, 3 etc.,
and said spring element having a brake element to which is fastened at least one spring body which carries said three locking elements,
whereby for the same tooth spacing an increase in the effective minimum tape take-up is achieved.

6. A tape cassette, in particular a magnetic tape cassette, having a housing and flanged reels contained therein, and a brake and tape tensioning means, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring said spring element from the braking position to the release position and vice versa,
wherein the spring element comprises two locking elements of different lengths, in a tangential direction to the peripheral edge of the toothed flange, said locking elements having two ends, one being an attached end and the other being a free end, locking points being provided at said free ends and the distance between the first and second locking points being determined by the relationship $$x_{1-2} = (n + \tfrac{1}{2}),$$

where
t is the tooth spacing and
n is the integer 0, 1, 2, 3 etc.,
whereby for the same tooth spacing an increase in the effective minimum tape take-up is achieved.

7. A tape cassette, in particular a magnetic tape cassette, having a housing and flanged reels contained therein, and a brake and tape tensioning means, in which at least one flange of each reel carries toothing at its periphery and a spring element for each reel having a braking position and a release position, said spring element engaging said toothing in said braking position but not in said release position, for use with a recording apparatus having an actuating element, said actuating element entering the cassette housing and transferring said spring element from the braking position to the release position and vice versa,
wherein the spring element comprises three locking elements of different lengths, in a tangential direction to the peripheral edge of the toothed flange, said locking elements having two ends, one being an attached end and the other being a free end, locking points being provided at said free ends and the distance between the first and third locking points being determined by the relationship $$x_{1-3} = t(n + \tfrac{1}{2} + \tfrac{1}{4}),$$

where
t is the tooth spacing and
n is the integer 0, 1, 2, 3 etc.,
whereby for the same tooth spacing an increase in the effective minimum tape take-up is achieved.

8. Means as claimed in claim 4, wherein the brake element is provided with at least one spring body having the shape of a tuning fork and possessing said two locking elements, the prongs of the tuning fork being of different lengths.

9. Means as claimed in claim 5, wherein the brake element is provided with at least one spring body having the shape of a tuning fork and possessing said three locking elements, the prongs of the tuning fork being of different length.

10. A tape cassette as claimed in claim 6, further comprising positioning projections provided on the cassette which guide each brake element from the braking position to the release position, each spring element being provided with actuating cams for interaction with said positioning projections.

11. A tape cassette as claimed in claim 7, further comprising positioning projections provided on the cassette which guide each brake element from the braking position to the release position, each spring element being provided with actuating cams for interaction with said positioning projections.

12. Means as claimed in claim 3, wherein said spring element has a brake element to which is attached at least one spring body which carries said m locking elements, and wherein the spring element comprises a cam portion for interaction with the positioning elements in the cassette housing, said cam portions being disposed between said spring body and a locking element.

13. Means as claimed in claim 3, wherein a cam portion is provided directly on each individual locking element for interaction with said positioning elements in the cassette housing.

* * * * *

UNITED STATES PATENT AND TRADEMARK OFFICE
CERTIFICATE OF CORRECTION

PATENT NO. : 4,679,110
DATED : Jul. 7, 1987
INVENTOR(S) : Schoettle et al.

It is certified that error appears in the above-identified patent and that said Letters Patent are hereby corrected as shown below:

On the Title Page, Item [30] should read:

-- July 6, 1984 [DE] Fed. Rep. of Germany........8420207 --.

Col. 9, line 36 " =(n+1/2)" should be -- =t(n+1/2) --

Signed and Sealed this

Fifteenth Day of December, 1987

Attest:

DONALD J. QUIGG

Attesting Officer     Commissioner of Patents and Trademarks